US011760162B2

(12) United States Patent
Dong et al.

(10) Patent No.: US 11,760,162 B2
(45) Date of Patent: Sep. 19, 2023

(54) THERMAL MANAGEMENT SYSTEM

(71) Applicant: HANGZHOU SANHUA RESEARCH INSTITUTE CO., LTD., Hangzhou (CN)

(72) Inventors: Junqi Dong, Hangzhou (CN); Shiwei Jia, Hangzhou (CN); Jie An, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 282 days.

(21) Appl. No.: 17/253,058

(22) PCT Filed: Jun. 9, 2020

(86) PCT No.: PCT/CN2020/095030
§ 371 (c)(1),
(2) Date: Dec. 16, 2020

(87) PCT Pub. No.: WO2020/253570
PCT Pub. Date: Dec. 24, 2020

(65) Prior Publication Data
US 2021/0268870 A1 Sep. 2, 2021

(30) Foreign Application Priority Data
Jun. 17, 2019 (CN) .......................... 201910521584.X

(51) Int. Cl.
*B60H 1/00* (2006.01)
*H01M 10/613* (2014.01)
(Continued)

(52) U.S. Cl.
CPC ..... *B60H 1/00921* (2013.01); *B60H 1/00278* (2013.01); *B60L 58/26* (2019.02);
(Continued)

(58) Field of Classification Search
CPC ............ B60H 1/00921; B60H 1/00278; B60H 2001/00928; B60H 2001/00935;
(Continued)

(56) References Cited
U.S. PATENT DOCUMENTS 3,537,274 A * 11/1970 Tilney ................... F25B 47/022
62/278
9,027,358 B2 * 5/2015 Eisenhour ................. F25B 6/02
62/149
(Continued)

FOREIGN PATENT DOCUMENTS

| CN | 102574442 A | 7/2012 |
| CN | 103287239 A | 9/2013 |

(Continued)

*Primary Examiner* — Tho V Duong
*Assistant Examiner* — Raheena R Malik
(74) *Attorney, Agent, or Firm* — Cheng-Ju Chiang

(57) ABSTRACT

The present application relates to a thermal management system including a compressor, an outdoor heat exchanger, a first valve control device, a first indoor heat exchanger, a second indoor heat exchanger and a second valve control device connected by pipelines. The thermal management system includes a heating and dehumidifying mode. In the heating and dehumidifying mode, the compressor, the first indoor heat exchanger, the second valve control device, the second indoor heat exchanger, the first valve control device and the outdoor heat exchanger are in communication to form a loop. The first valve control device and the second valve control device both include a communication mode and a throttle mode. In the heating and dehumidifying mode, the second valve control device is in the throttle mode, and the first valve control device is in the throttle mode or the communication mode. In the cooling mode, the first valve control device is in the throttle mode, and the second valve control device is in the communication mode or the throttle mode.

19 Claims, 13 Drawing Sheets

(51) Int. Cl.
*H01M 10/615* (2014.01)
*H01M 10/625* (2014.01)
*H01M 10/6556* (2014.01)
*H01M 10/6568* (2014.01)
*H01M 10/663* (2014.01)
*B60L 58/27* (2019.01)
*B60L 58/26* (2019.01)

(52) U.S. Cl.
CPC ........... *B60L 58/27* (2019.02); *H01M 10/613* (2015.04); *H01M 10/615* (2015.04); *H01M 10/625* (2015.04); *H01M 10/6556* (2015.04); *H01M 10/6568* (2015.04); *H01M 10/663* (2015.04); *B60H 2001/00928* (2013.01); *B60H 2001/00935* (2013.01); *B60H 2001/00949* (2013.01); *H01M 2220/20* (2013.01)

(58) Field of Classification Search
CPC ...... B60H 2001/00949; H01M 10/613; H01M 10/615; H01M 10/625; H01M 10/6556; H01M 10/6568; H01M 10/663; H01M 2220/20; B60L 58/27; B60L 58/26
USPC ...................................................... 62/324.1
See application file for complete search history.

(56) References Cited

U.S. PATENT DOCUMENTS

| | | | |
|---|---|---|---|
| 2003/0019232 A1* | 1/2003 | Matsuo | ................... B60L 1/003 |
| | | | 62/324.1 |
| 2021/0268870 A1* | 9/2021 | Dong | ................. B60H 1/00278 |

FOREIGN PATENT DOCUMENTS

| | | |
|---|---|---|
| CN | 103972607 A | 8/2014 |
| CN | 204870439 U | 12/2015 |
| CN | 111231612 A | 6/2020 |
| DE | 102005005430 A1 | 8/2006 |
| DE | 102014108454 A1 | 12/2015 |
| DE | 102016004999 B3 | 8/2017 |
| JP | H7-172160 A | 7/1995 |
| JP | H8-91042 A | 4/1996 |
| WO | 2012/120843 A1 | 9/2012 |
| WO | 2018/190081 A1 | 10/2018 |
| WO | WO-2018190081 A1 * | 10/2018 ............... B60H 1/22 |

* cited by examiner

THERMAL MANAGEMENT SYSTEM

CROSS-REFERENCE TO RELATED APPLICATION

This patent application is a 35 U.S.C. § 371 National Phase conversion of International (PCT) Patent Application No. PCT/CN2020/095030, filed on Jun. 9, 2020, which claims priority of a Chinese Patent Application No. 201910521584.X, filed on Jun. 17, 2019 and titled "THERMAL MANAGEMENT SYSTEM", the entire content of which is incorporated herein by reference. The PCT International Patent Application was filed in Chinese.

TECHNICAL FIELD

The present application relates to a field of thermal management technology, and in particular to a thermal management system.

BACKGROUND

With the rapid development of new energy vehicles, vehicle air-conditioning systems are increasingly favored by vehicle companies. In a new energy vehicle air-conditioning system, the thermal management system can cool and heat the air in the vehicle cabin, which can provide passengers with a comfortable riding environment, reduce the fatigue strength of the driver, and improve driving safety.

The related thermal management system realizes a cooling mode, a heating mode and a heating and dehumidifying mode through multiple one-way throttle valves, and the system structure is relatively complicated.

SUMMARY

In view of the above problem, the present application provides a thermal management system with a simple system structure.

On the one hand, an embodiment of the present application adopts the following technical solutions:

a thermal management system comprising: a compressor, an outdoor heat exchanger, a first valve control device, a first indoor heat exchanger, a second indoor heat exchanger and a second valve control device, the compressor, the outdoor heat exchanger, the first valve control device, the first indoor heat exchanger, the second indoor heat exchanger and the second valve control device are connected by pipelines, the thermal management system comprising a cooling mode and a heating and dehumidifying mode;

in the cooling mode: the first valve control device and the second valve control device are opened; the compressor, the outdoor heat exchanger, the first valve control device, the second indoor heat exchanger, the second valve control device and the first indoor heat exchanger are in communication to form a loop; a refrigerant compressed by the compressor is adapted to flow in sequence through the outdoor heat exchanger, the first valve control device, the second indoor heat exchanger, the second valve control device and the first indoor heat exchanger, and enters the compressor again to circulate in this way;

in the heating and dehumidifying mode: the first valve control device and the second valve control device are opened; the compressor, the first indoor heat exchanger, the second valve control device, the second indoor heat exchanger, the first valve control device and the outdoor heat exchanger are in communication to form a loop; the refrigerant compressed by the compressor flows in sequence through the first indoor heat exchanger, the second valve control device, the second indoor heat exchanger, the first valve control device and the outdoor heat exchanger, and enters the compressor again to circulate in this way;

wherein the first valve control device and the second valve control device both include a fully open mode and a throttle mode; in the heating and dehumidifying mode, the second valve control device is in the throttle mode, and the first valve control device is in the throttle mode or the fully open mode; in the cooling mode, the first valve control device is in the throttle mode, and the second valve control device is in the fully open mode or the throttle mode.

On the other hand, an embodiment of the present application adopts the following technical solutions:

a thermal management system comprising an air-conditioning box, a compressor, an outdoor heat exchanger, a first valve control device, a first indoor heat exchanger, a second indoor heat exchanger and a second valve control device, the first indoor heat exchanger and the second indoor heat exchanger are arranged in an air-conditioning box, the outdoor heat exchanger is arranged outside the air-conditioning box and in a front vehicle cabin, the thermal management system comprises a cooling mode and a heating mode, the first valve control device and the second valve control device are both bidirectional throttle valves;

in the cooling mode: the first valve control device and the second valve control device are opened; the compressor, the outdoor heat exchanger, the first valve control device, the second indoor heat exchanger, the second valve control device and the first indoor heat exchanger are in communication to form a loop; a refrigerant compressed by the compressor is adapted to flow in sequence through the outdoor heat exchanger, the first valve control device, the second indoor heat exchanger, the second valve control device and the first indoor heat exchanger, and enters the compressor again to circulate in this way; the first valve control device is in a throttle mode, the second valve control device is in a fully open mode or a throttle mode; the outdoor heat exchanger acts as a condenser to release heat into the air, the first indoor heat exchanger and the second indoor heat exchanger serve as evaporators to absorb heat from the air in the air-conditioning box;

in the heating mode, the first valve control device and the second valve control device are opened, the compressor, the first indoor heat exchanger, the second valve control device, the second indoor heat exchanger, the first valve control device and the outdoor heat exchanger are in communication to form a loop, the refrigerant compressed by the compressor is adapted to flow in sequence through the first indoor heat exchanger, the second valve control device, the second indoor heat exchanger, the first valve control device and the outdoor heat exchanger, and enters the compressor again to circulate in this way; the first valve control device is in the throttle mode, the second valve control device is in the fully open mode or the throttle mode, the first indoor heat exchanger and the second indoor heat exchanger act as condensers to release heat into the air-conditioning box, and the outdoor heat exchanger acts as an evaporator to absorb heat in the air.

The first valve control device and the second valve control device of the thermal management system of the present application both include a fully open mode and a throttle mode. That is, through two bidirectional throttle valves,

DETAILED DESCRIPTION

Figure 1:
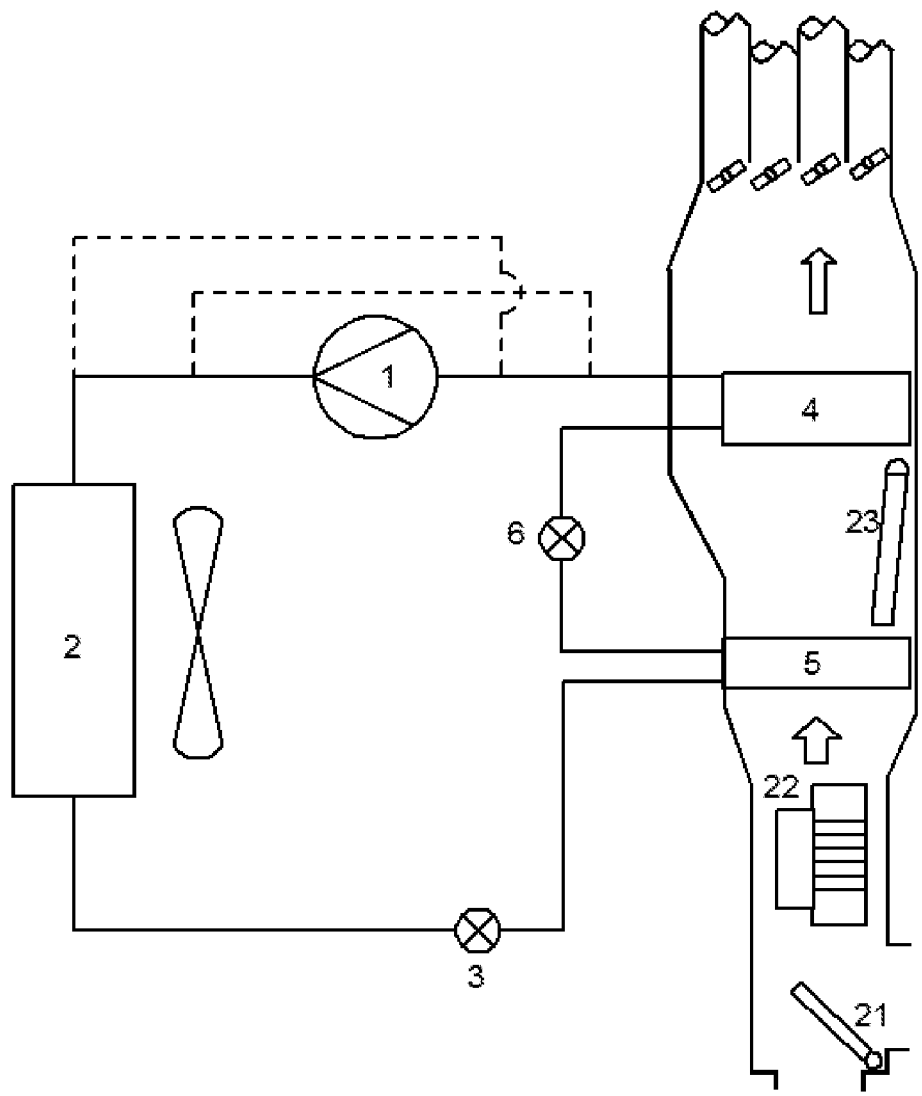
FIG. 1 is a schematic diagram of a working principle of a cooling mode in accordance with a first embodiment of the present application.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects.

The thermal management systems according to the exemplary embodiments of the present application will be described in detail below with reference to the drawings. In the case of no conflict, the features in the following examples and embodiments can complement or be combined with each other.

Figure 2:
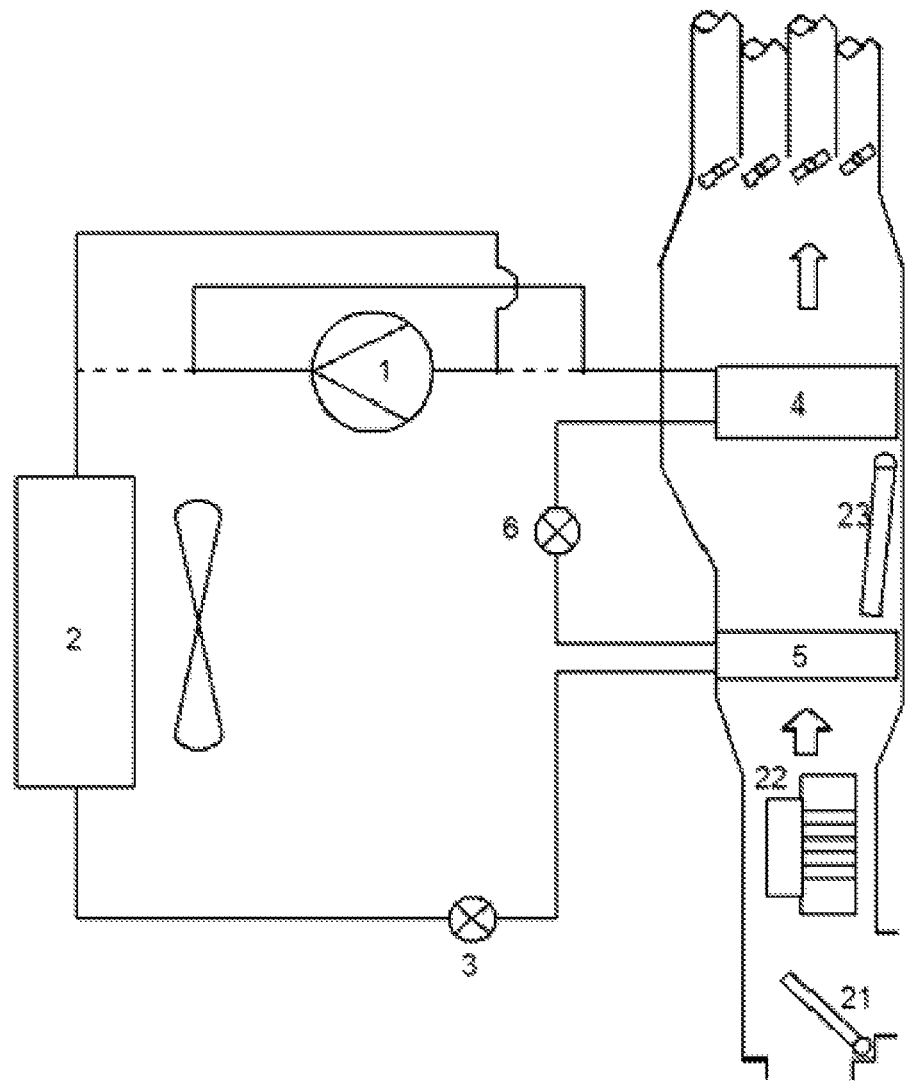
FIG. 2 is a schematic diagram of a working principle of a heating and dehumidifying mode in accordance with the first embodiment of the present application.

A first embodiment of the present application as shown in FIGS. 1 and 2 discloses a thermal management system which can be used in a vehicle air-conditioning system. The thermal management system includes a compressor 1, an outdoor heat exchanger 2, a first valve control device 3, a first indoor heat exchanger 4, a second indoor heat exchanger 5 and a second valve control device 6 which are connected by pipelines. The thermal management system includes a cooling mode and a heating and dehumidifying mode, which are respectively used for cooling and heating and dehumidifying the air in the passenger compartment.

The thermal management system also includes an air-conditioning box for adjusting the temperature and/or humidity in a vehicle compartment, and an air duct is provided in the air-conditioning box. The first indoor heat exchanger 4 and the second indoor heat exchanger 5 are installed in the air duct. The air-conditioning box is also provided with a damper 21, a blower 22 and a control damper 23. The damper 21 can be switched to the corresponding air outlet according to an internal circulation mode or an external circulation mode of the vehicle air conditioner. The control damper 23 can adjust the air volume flowing through the first indoor heat exchanger 4 per unit time. The outdoor heat exchanger 2 is arranged outside the air-conditioning box and in a front vehicle cabin.

As shown in FIG. 1, solid lines show a refrigerant cycle in the cooling mode. The first valve control device 3 and the second valve control device 6 are opened, an outlet of the compressor 1, the outdoor heat exchanger 2, the first valve control device 3, the second indoor heat exchanger 5, the second valve control device 6 and the first indoor heat exchanger 4 are in communication in sequence, and the first indoor heat exchanger 4 is in communication with an inlet of the compressor 1 to form a loop. Dotted lines can be understood as having valves set in the flow paths. The valve is closed so that the flow path is not in communication. When the thermal management system is switched to the heating mode, the valves in the flow paths where the dotted lines are located are opened, so that the flow paths are in communication.

As shown in FIG. 2, solid lines show a refrigerant circulation loop in the heating and dehumidifying mode. The first valve control device 3 and the second valve control device 6 are opened, the outlet of the compressor 1, the first indoor heat exchanger 4, the second valve control device 6, the second indoor heat exchanger 5, the first valve control device 3 and the outdoor heat exchanger 2 are in communication in sequence, and the outdoor heat exchanger 2 is in communication with the inlet of the compressor 1 to form a loop. The dotted lines can be understood as having valves in the flow paths. The valve is closed so that the flow path is not in communication. When the thermal management system is switched to the cooling mode, the valves in the flow paths where the dotted lines are located are opened, so that the flow paths are in communication.

The first valve control device 3 and the second valve control device 6 may be multifunctional electronic expansion valves, or a combined device of multiple electronic expansion valves. Both the first valve control device 3 and the second valve control device 6 include a fully open mode and a throttle mode. In this embodiment, the first valve control device 3 and the second valve control device 6 have a two-way throttling function. In the cooling mode, the second valve control device 6 is in the fully open mode or the throttle mode, and the first valve control device 3 is in the throttle mode. In the heating and dehumidifying mode, the second valve control device 6 is in the throttle mode, and the first valve control device 3 is in the throttle mode or the fully open mode. Therefore, the first valve control device 3 and the second valve control device 6 are both bidirectional throttle valves.

A working principle of the cooling mode described in this embodiment is as follows: firstly, the high-temperature and high-pressure gaseous refrigerant compressed by the compressor 1 enters the outdoor heat exchanger 2. The outdoor heat exchanger 2 transfers heat to the outside environment. The refrigerant is throttled by the first valve control device 3 after being cooled. The low-temperature and low-pressure refrigerant enters the second indoor heat exchanger 5. At this time, the second indoor heat exchanger 5 is equivalent to an evaporator. It should be noted that the air in the air duct firstly flows through the second indoor heat exchanger 5, and then flows through the first indoor heat exchanger 4 to be cooled down a second time. The refrigerant in the second indoor heat exchanger 5 exchanges heat with the air having relatively high temperature. The temperature of the refrigerant rises and the refrigerant becomes gaseous, and the temperature of the air drops. The refrigerant from the second indoor heat exchanger 5 is throttled again by the second valve control device 6 (the second valve control device 6 is in the throttle mode). The low-temperature and low-pressure refrigerant enters the first indoor heat exchanger 4. At this time, the first indoor heat exchanger 4 is equivalent to an evaporator. The refrigerant exchanges heat with the relatively high temperature air again. The air is discharged into the passenger compartment after being cooled for a second time so as to achieve the purpose of cooling the passenger compartment environment. After that, the temperature of the refrigerant enters the compressor 1 and is compressed again to circulate in this way. In the above-mentioned cooling mode, heat is firstly released through the outdoor heat exchanger 2, and then absorbed through the two indoor heat exchangers to cool the air for twice time. This improves the heat exchange capacity, provides more cooling capacity, and has a better cooling effect. After being compressed by the compressor 1, the refrigerant flows to the outdoor heat exchanger firstly. The high temperature and high pressure refrigerant does not flow through the air-conditioning box. This reduces the possibility of high-temperature refrigerant transferring heat to the air in the air-conditioning box, which is beneficial to improve the cooling capacity and energy efficiency of the system.

As shown in FIG. 2, a working principle of the heating and dehumidifying mode described in this embodiment is as follows: firstly, the high-temperature and high-pressure gaseous refrigerant compressed by the compressor 1 enters the first indoor heat exchanger 4. At this time, the first indoor heat exchanger 4 is equivalent to a condenser. The refrigerant exchanges heat with the air through the first indoor heat exchanger 4. The heat of the refrigerant is transferred to the air, and the temperature of the air rises. Then, the refrigerant enters the second valve control device 6 and is throttled. The low-temperature and low-pressure refrigerant enters the second indoor heat exchanger 5. At this time, the second indoor heat exchanger 5 is equivalent to an evaporator. The refrigerant absorbs the heat of the relatively high-temperature air through the second indoor heat exchanger 5, condenses the moisture in the air and is discharged. The refrigerant is throttled by the first valve control device 3 (the first valve control device 3 is in the throttle mode) and then enters the outdoor heat exchanger 2, so that the outdoor heat exchanger 2 and the second indoor heat exchanger 5 have different evaporation temperatures. Finally, the refrigerant enters the compressor 1 and is compressed again to circulate in this way. Arrows in FIG. 2 shows the flow of air in the air-conditioning box. The air firstly flows through the second indoor heat exchanger 5, and while the air is cooled down, the moisture in the air is condensed and discharged. The lower temperature air is heated when it flows through the second indoor heat exchanger 4, and the air temperature rises in order to achieve the purpose of dehumidifying and heating the passenger compartment. In heating and dehumidifying mode of related thermal management systems, it is to firstly release heat through the outdoor heat exchanger, and then through the indoor heat exchanger to heat the air so as to heat the passenger compartment. As a result, part of its heat will be lost to the outside environment through the outdoor heat exchanger. Different from the related thermal management systems, in the heating and dehumidifying mode of this embodiment, heat is firstly released through the first indoor heat exchanger 4 to heat the air which enters the passenger compartment, and then the second indoor heat exchanger 5 and the outdoor heat exchanger 2 are applied to absorb heat, which not only achieves the purpose of dehumidifying the air, but also reduces heat loss, provides more heat and has a better heating effect.

Optionally, in some embodiments, in the cooling mode of the system of the present application, the second valve control device 6 may also be in the fully open mode. At this time, the first indoor heat exchanger 4 and the second indoor heat exchanger 5 have the same evaporation temperature. In the heating and dehumidifying mode of the system of the present application, the first valve control device 3 may also be in the fully open mode. At this time, the outdoor heat exchanger 2 and the second indoor heat exchanger 5 have the same evaporation temperature.

A second embodiment of the present application is shown in FIGS. 3 to 6. Based upon the first embodiment, the thermal management system of the present application further includes a heating mode. When dehumidification is not required, the heating mode can be activated to directly heat the environment in the passenger compartment. In the heating mode, the first valve control device 3 and the second valve control device 6 are opened. The compressor 1, the first indoor heat exchanger 4, the second valve control device 6, the second indoor heat exchanger 5, the first valve control device 3 and the outdoor heat exchanger 2 are communicated to form a loop. The second valve control device 6 is fully opened, and the second valve control device 6 is in the fully open mode.

Specifically, the second valve control device 6 includes a first branch, a second branch and a third branch. The first branch, the second branch and the third branch are arranged in parallel. The first branch is provided with a first throttle unit 61, the second branch is provided with a second throttle unit 62, and the third branch is provided with a control valve unit 63.

The first valve control device 3 includes a fourth branch and a fifth branch which are arranged in parallel. The fourth branch is provided with a third throttle unit 31. The fifth branch is provided with a fourth throttle unit 32. In the heating mode and the heating and dehumidifying mode, the fourth throttle unit 32 is closed, and the third throttle unit 31 is opened and throttles the fourth branch. In the cooling mode, the third throttle unit 31 is closed, and the fourth throttle unit 32 is opened and throttles the fifth branch.

Figure 3:
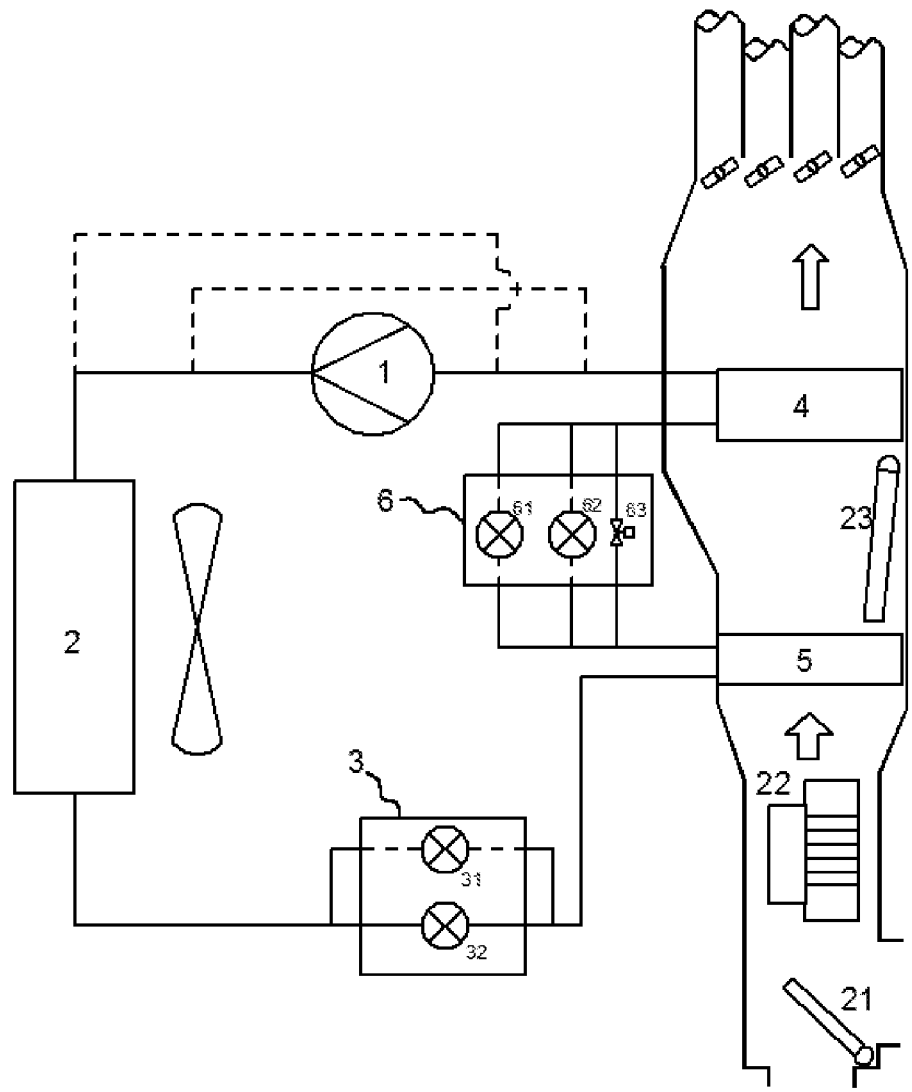
FIG. 3 is a schematic diagram of a working principle of a cooling mode in accordance with a second embodiment of the present application.

As shown in FIG. 3, in the cooling mode, the first valve control device 3 is in the throttle mode. That is, the fourth throttle unit 32 throttles the fifth branch where it is located, the first throttle unit 61 and the second throttle unit 62 are closed, the control valve unit 63 is opened, and the third branch is in communication. Optionally, in some embodiments, the second valve control device 6 further includes a sixth branch arranged in parallel with the first branch, the second branch and the third branch. A fifth throttle unit is installed in the sixth branch. In the cooling mode, the first throttle unit 61, the second throttle unit 62 and the control valve unit 63 are closed. The fifth throttle unit opens and throttles the sixth branch where it is located.

Figure 4:
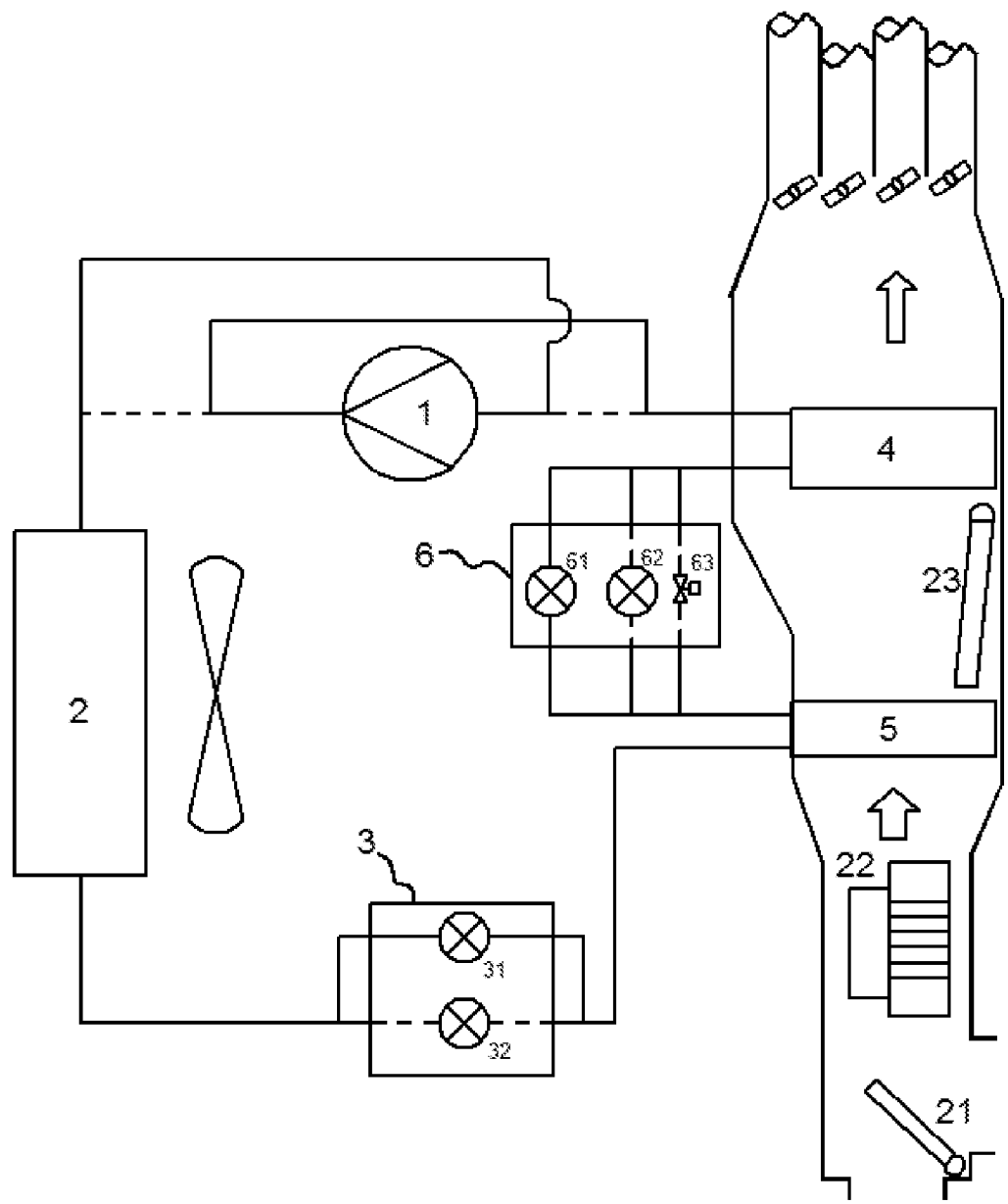
FIG. 4 is a schematic diagram of a working principle of a heating and dehumidifying mode in accordance with the second embodiment of the present application.

As shown in FIG. 4, in the heating and dehumidifying mode, the second throttle unit 62 and the control valve unit 63 are closed, the first throttle unit 61 is opened and throttles the first branch, the fourth throttle unit 32 is closed, and the third throttle unit 31 is opened and throttles the fourth branch. Optionally, in some embodiments, in the heating and dehumidifying mode, the second throttle unit 62 and the control valve unit 63 are closed, the first throttle unit 61 is opened and throttles the first branch, and the first valve control device 3 is in a fully open mode. Specifically, the first valve control device 3 includes a seventh branch arranged in parallel with the fourth branch and the fifth branch. A control valve unit is installed in the seventh branch.

Figure 5:
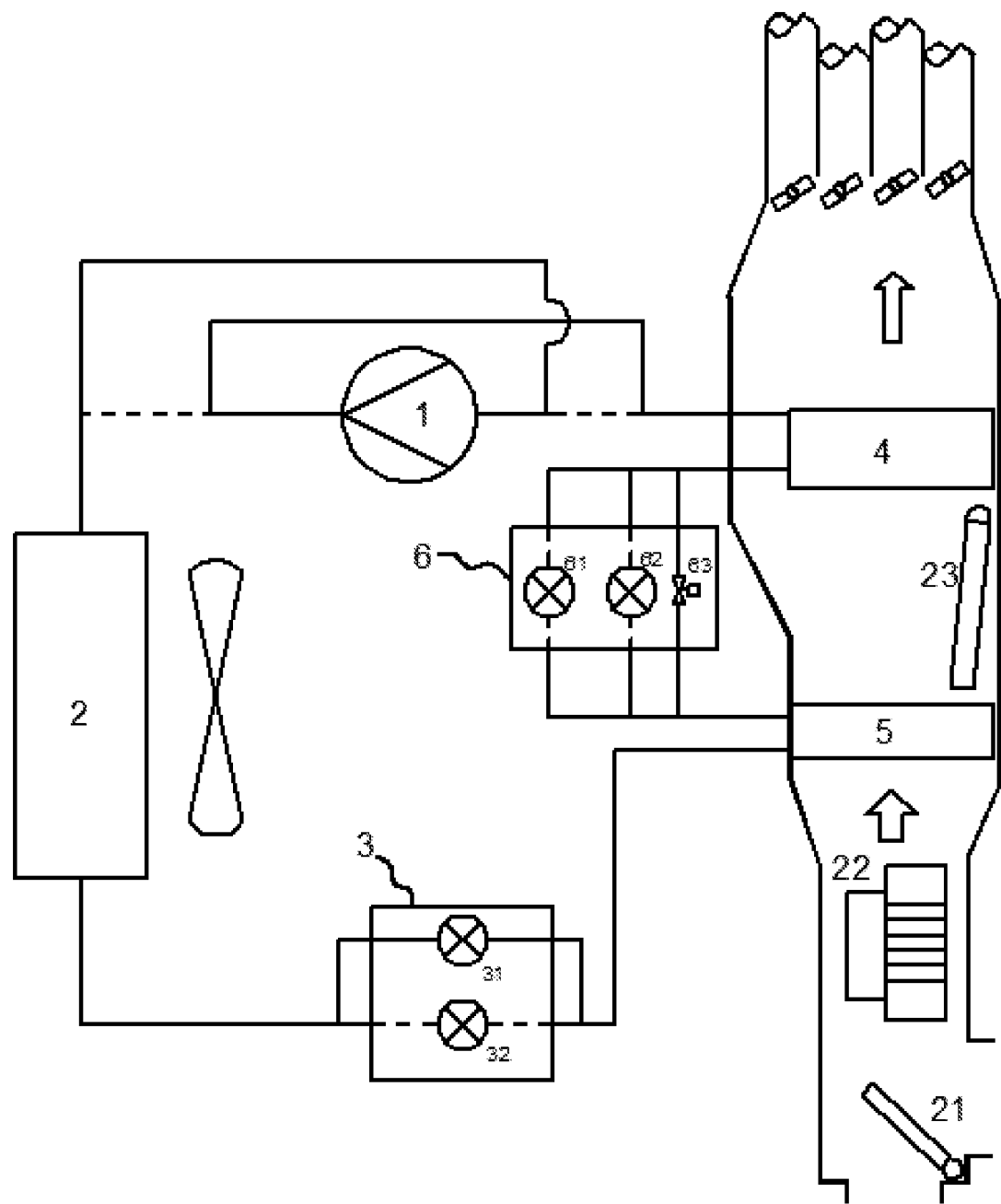
FIG. 5 is a schematic diagram of a working principle of a first heating mode in accordance with the second embodiment of the present application.

The heating mode includes a first heating mode and a second heating mode. As shown in FIG. 5, when the system is switched to the first heating mode, the first throttle unit 61 is closed, the second throttle unit 62 is closed, the control valve unit 63 is opened, and the third branch is in communication. In this mode, the first indoor heat exchanger 4 and the second indoor heat exchanger 5 are both equivalent to condensers, which increases the heat exchange capacity of the system and makes the heating effect better.

Figure 6:
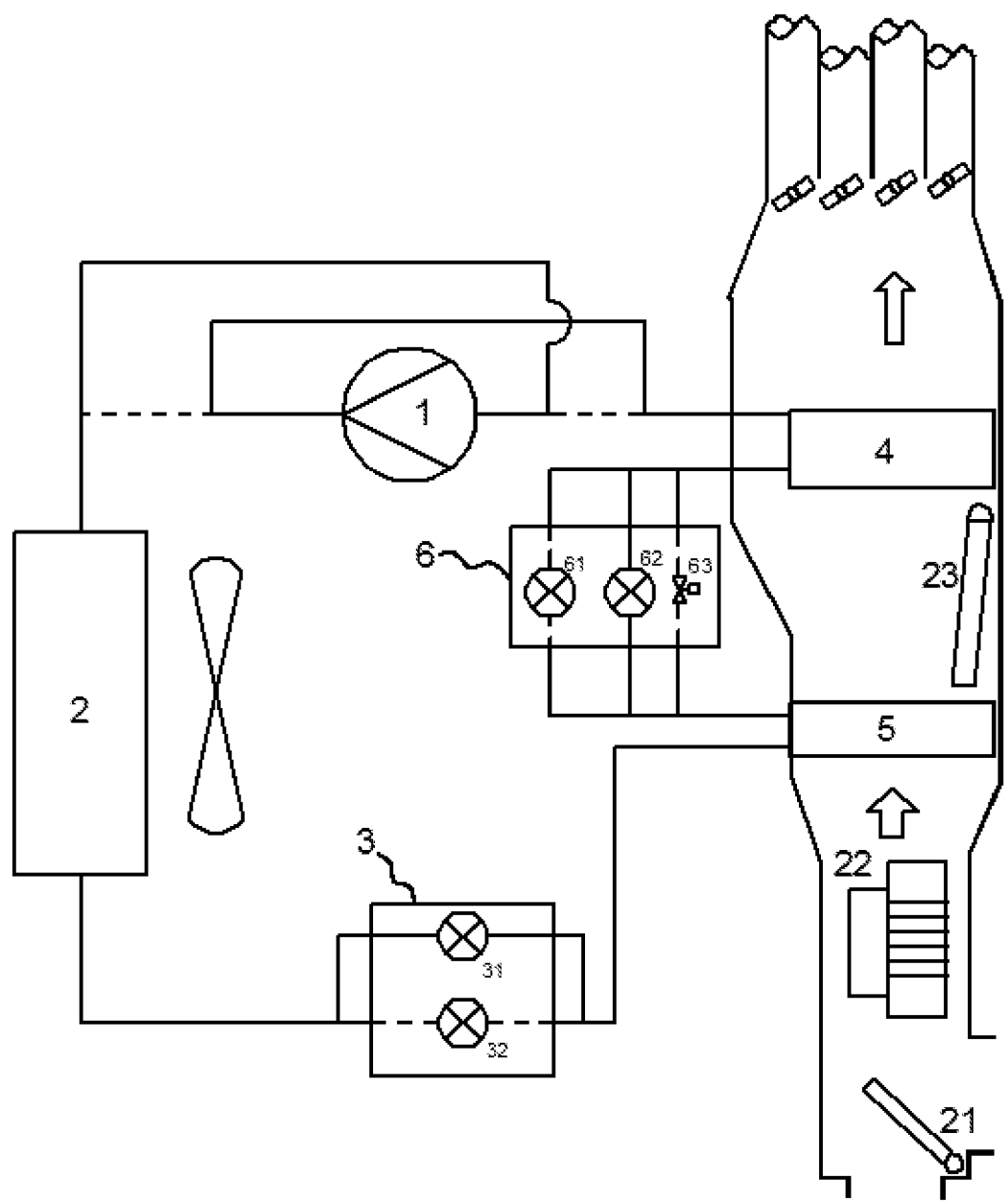
FIG. 6 is a schematic diagram of a working principle of a second heating mode in accordance with the second embodiment of the present application.

As shown in FIG. 6, when the system is switched to the second heating mode, the first throttle unit 61 is closed, the control valve unit 63 is closed, and the second throttle unit 62 is opened and throttles the second branch. The flow state of the second throttle unit 62 in the second heating mode is greater than the flow state of the first throttle unit 61 in the heating and dehumidifying mode. Therefore, after the refrigerant flowing through the second throttle unit 62 is throttled, the temperature may still be higher than the air temperature. Moreover, in the second heating mode, the pressure of the refrigerant entering the second indoor heat exchanger 5 is reduced, so that the second indoor heat exchanger 5 and the first indoor heat exchanger 4 have different working pressures. Therefore, the pressure requirement of the second indoor heat exchanger 5 can be lower than that of the first indoor heat exchanger 4. Pressure resistance requirements of heat exchange tubes in the second indoor heat exchanger 5 are also lower. Therefore, cross sections of medium channels of the heat exchange tubes can be increased so as to increase the heat exchange capacity of the heat exchanger. In the second heating mode, both the first indoor heat exchanger 4 and the second indoor heat exchanger 5 are equivalent to condensers, and play a role in heating the air. This improves the heat exchange capacity of the system and is capable of improving the heating effect.

A third embodiment of the present application is shown in FIGS. 7 to 13. Based upon the first embodiment above, the system of the present application further includes a first fluid switching device 7, a first heat exchanger 8 and a gas-liquid separator 9. The first fluid switching device 7 is a four-way valve which includes a first port 71, a second port 72, a third port 73 and a fourth port 74. The first port 71 is in communication with an inlet of the gas-liquid separator 9. An outlet of the gas-liquid separator 9 is in communication with the second heat exchange portion 82. The second port 72 is in communication with the outdoor heat exchanger 2. The third port 73 is in communication with the outlet of the compressor 1. The fourth port 74 is in communication with the first indoor heat exchanger 4. In some embodiments, the gas-liquid separator 9 may not be included. Optionally, the compressor 1 has a gas-liquid separation function.

The first heat exchanger 8 includes a first heat exchange portion 81 and a second heat exchange portion 82 which are capable of exchanging heat. The first heat exchange portion 81 includes a first connection port 811 and a second connection port 812. The second heat exchange portion 82 includes a third connection port 821 and a fourth connection port 822. The first connection port 811 is in communication with the outdoor heat exchanger 2 through pipelines. The second connection port 812 is in communication with the first valve control device 3. The third connection port 821 is in communication with the inlet of the compressor 1. The fourth connection port 822 is in communication with the outlet of the gas-liquid separator 9.

Figure 7:
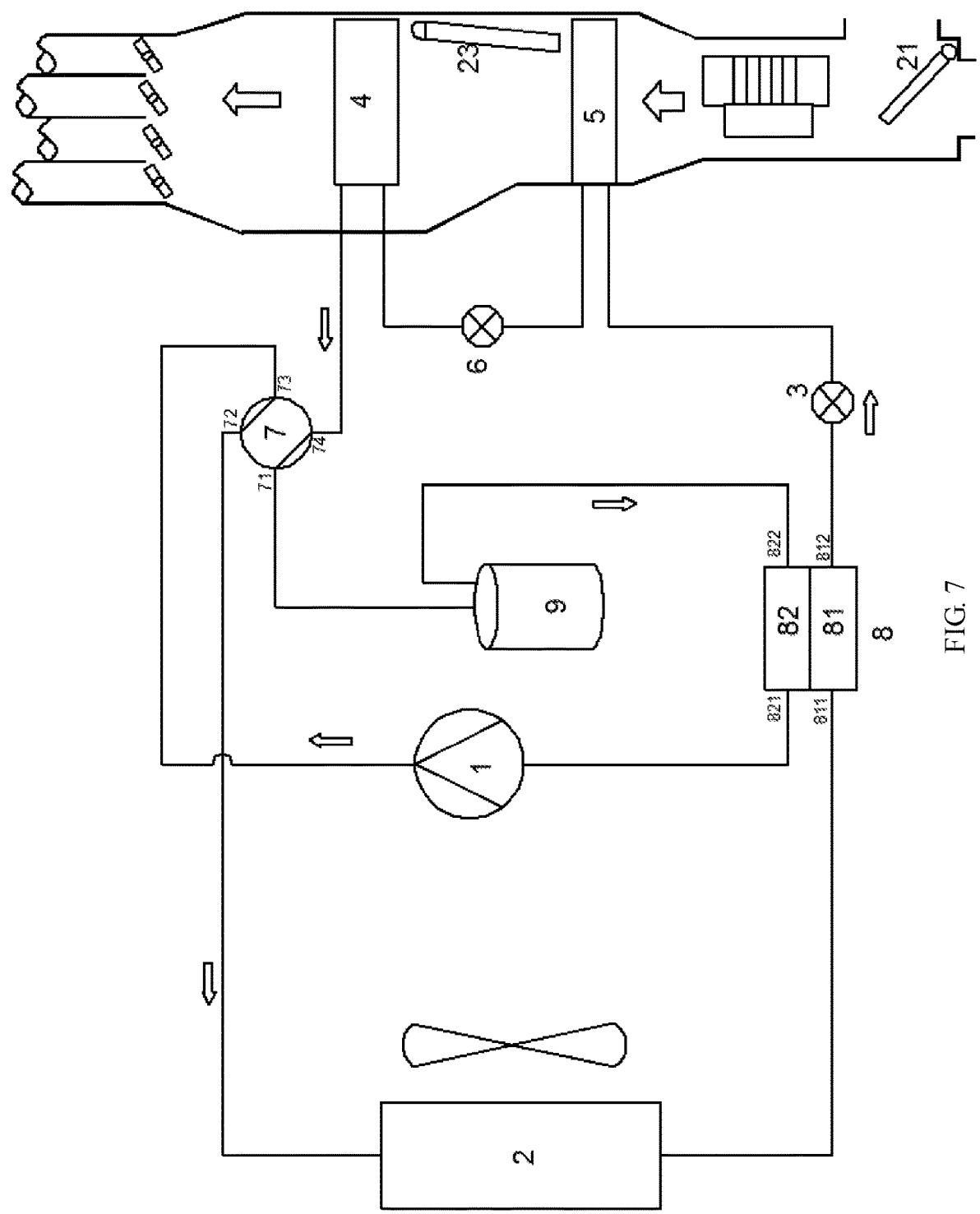
FIG. 7 is a schematic diagram of a working principle of a cooling mode in accordance with a third embodiment of the present application.

Specifically, as shown in FIG. 7, in the cooling mode, the first port 71 and the fourth port 74 are in communication, the second port 72 and the third port 73 are in communication, the first valve control device 3 is in the throttle mode, the second valve control device 6 is in the throttle mode, and the compressor 1, the outdoor heat exchanger 2, the first heat exchange portion 81, the first valve control device 3, the second indoor heat exchanger 5, the second valve control device 6, the first indoor heat exchanger 4, the gas-liquid separator 9 and the second heat exchange portion 82 are in communication to form a loop.

Figure 9:
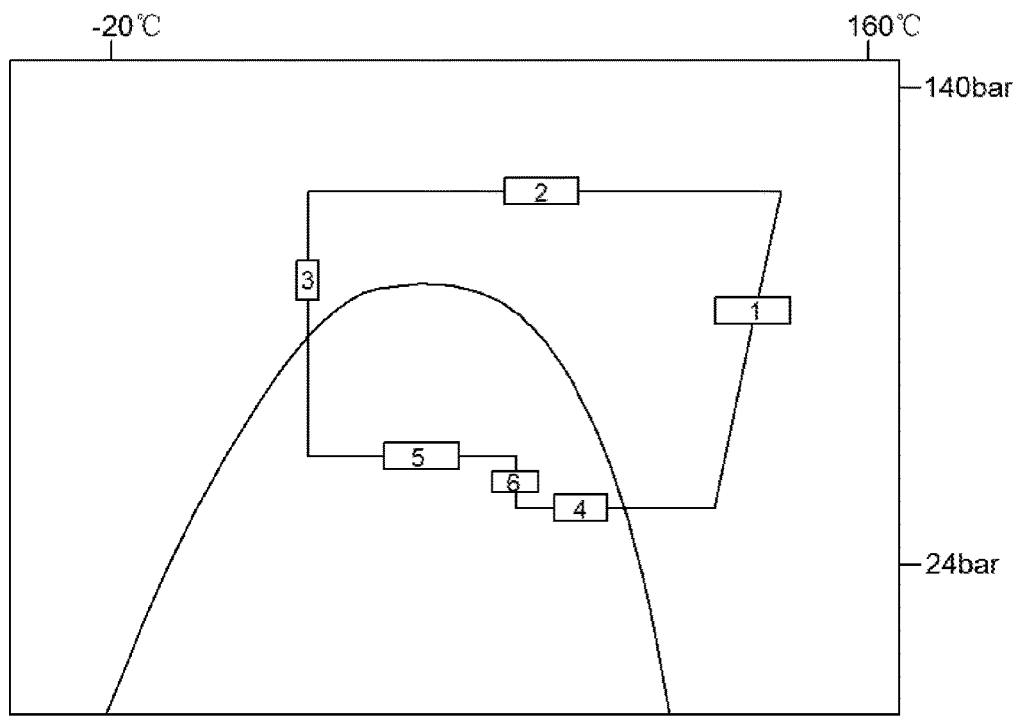
FIG. 9 is a schematic diagram of a pressure-enthalpy relationship of the second valve control device in a throttle mode in accordance with the third embodiment of the present application.

In the cooling mode of this embodiment, firstly, the high-temperature and high-pressure gas refrigerant compressed by the compressor 1 enters the outdoor heat exchanger 2. The outdoor heat exchanger 2 transfers heat to the outside environment. The refrigerant flows through the first heat exchange portion 81 after being cooled. The temperature of the refrigerant in the first heat exchange portion 81 is higher than the temperature of the refrigerant in the second heat exchange portion 82. Therefore, the temperature of the refrigerant decreases after flowing through the heat exchange between the first heat exchange portion 81 and the second heat exchange portion 82. The low temperature refrigerant is throttled by the first valve control device 3 and the temperature of the refrigerant is further reduced. The low-temperature and low-pressure refrigerant then enters the second indoor heat exchanger 5. At this time, the second indoor heat exchanger 5 is equivalent to an evaporator which can exchange heat with the air so as to reduce the air temperature. It should be noted that the air in the air duct firstly flows through the second indoor heat exchanger 5 and then flows through the first indoor heat exchanger 4 so that the air can be cooled twice. The refrigerant in the second indoor heat exchanger 5 exchanges heat with the relatively high-temperature air, so that the temperature of the refrigerant rises and the refrigerant becomes gaseous, and the temperature of the air drops. The refrigerant flowing out of the second indoor heat exchanger 5 is throttled again by the second valve control device 6. The low-temperature and low-pressure refrigerant then enters the first indoor heat exchanger 4. As shown in FIG. 9, it is a pressure enthalpy diagram of the second valve control device 6 in the throttle mode. In this mode, the first indoor heat exchanger 4 is also equivalent to an evaporator. The first indoor heat exchanger 4 and the second indoor heat exchanger 5 have different evaporation temperatures. The refrigerant in the first indoor heat exchanger 4 exchanges heat with the relatively high-temperature air again, and the air is discharged into the passenger compartment after being cooled twice, so as to achieve the purpose of cooling the passenger compartment environment. After that, the refrigerant temperature rises and becomes gaseous or gas-liquid two-phase, and then enters the gas-liquid separator 9. The gaseous refrigerant comes out of the gas-liquid separator 9 and enters the compressor 1, where it is compressed again to circulate in this way. In the above-mentioned cooling mode, heat is firstly released through the outdoor heat exchanger 2 and then transferred to the second heat exchange portion 82 through the first heat exchange portion 81. This reduces the temperature upstream of the first valve control device 3. Two heat exchangers are utilized to absorb heat so as to cool the air twice, which provides more cooling capacity and better cooling effect.

Figure 8:
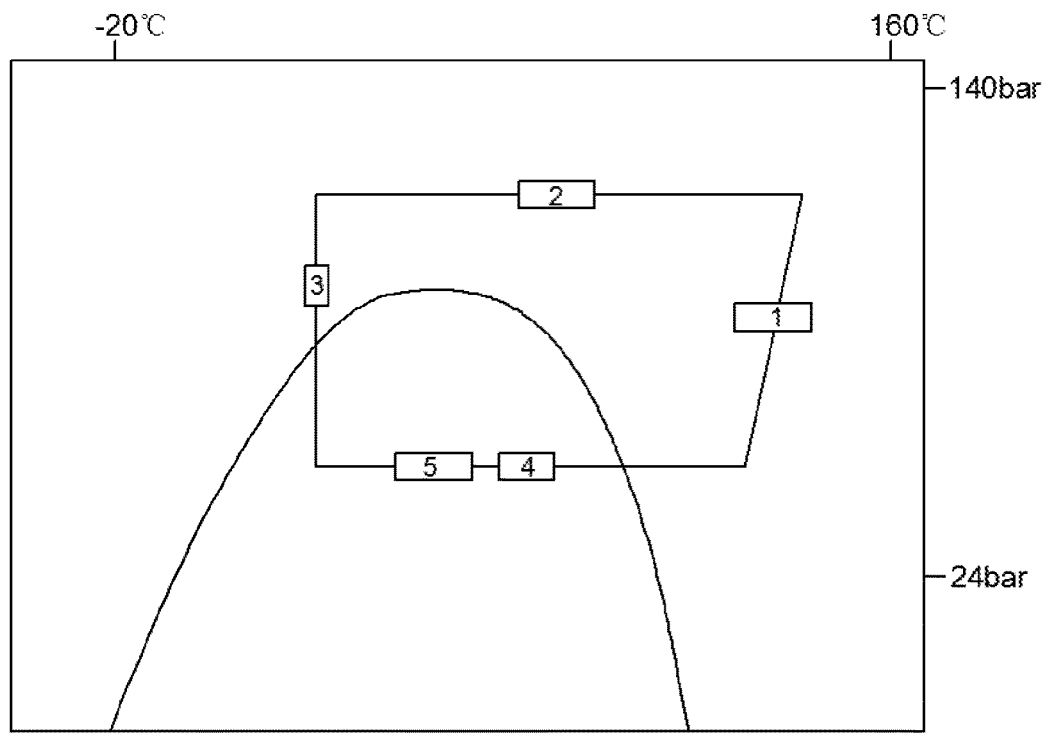
FIG. 8 is a schematic diagram of a pressure-enthalpy relationship of a second valve control device in a fully open mode in accordance with the third embodiment of the present application.

The second valve control device 6 may be a multifunctional electronic expansion valve or a combined device of multiple valves. In some embodiments, when the system of the present application is in the cooling mode, the second valve control device 6 may also be in the fully open mode. FIG. 8 is a pressure enthalpy diagram of the second valve control device 6 in the fully open mode.

Figure 10:
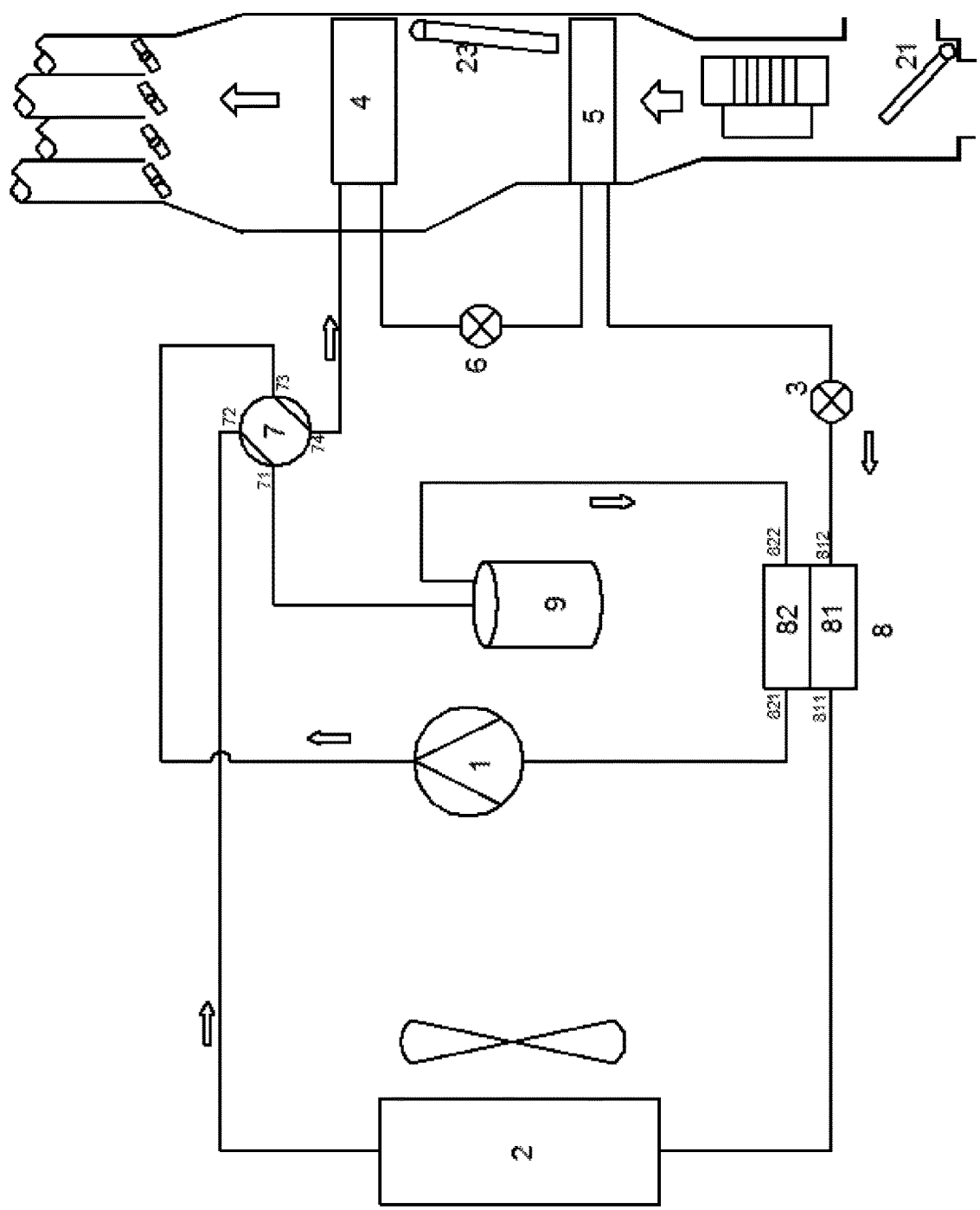
FIG. 10 is a schematic diagram of a working principle of a heating mode in accordance with the third embodiment of the present application.
Figure 11:
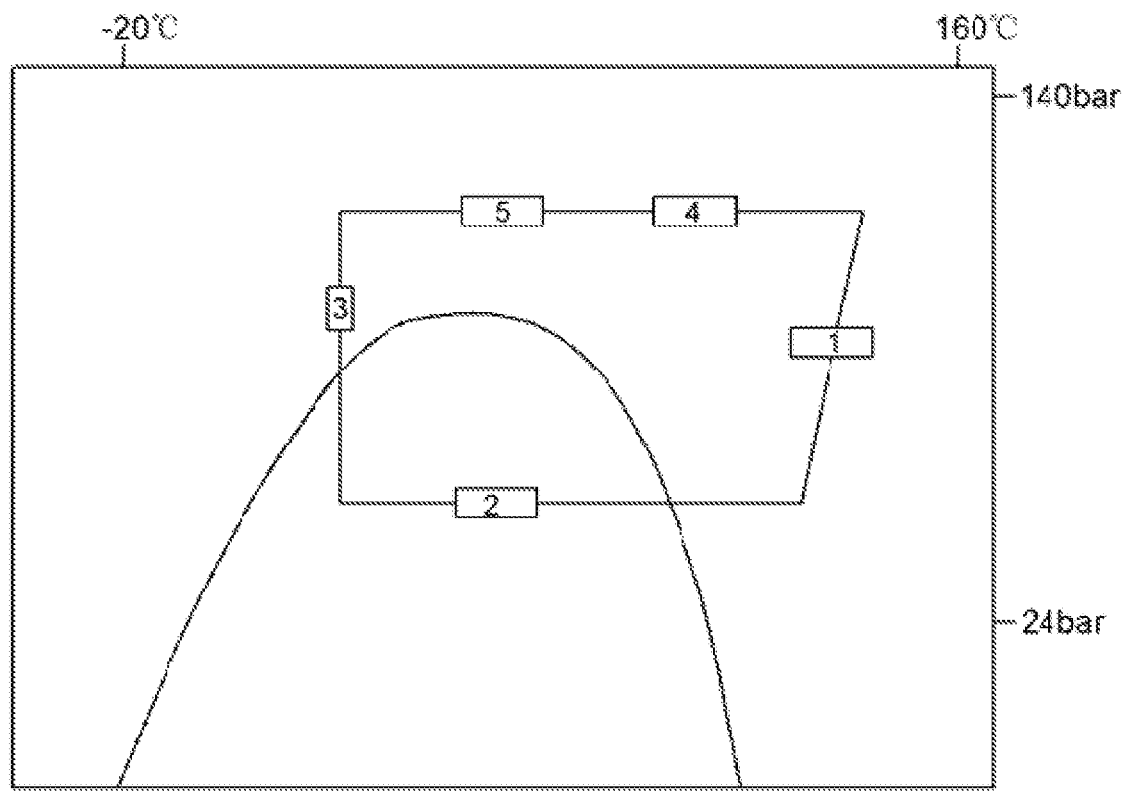
FIG. 11 is a schematic diagram of a pressure-enthalpy relationship in the heating mode in accordance with the third embodiment of the present application.

As shown in FIGS. 10 and 11, in the heating mode, the first port 71 and the second port 72 are in communication, and the third port 73 and the fourth port 74 are in communication. The first valve control device 3 is in the throttle mode, and the second valve control device 6 is in the fully open mode. The compressor 1, the first indoor heat exchanger 4, the second valve control device 6, the second indoor heat exchanger 5, the first valve control device 3, and the first heat exchange portion 81, the outdoor heat exchanger 2, the gas-liquid separator 9 and the second heat exchange portion 82 are communicated to form a loop. FIG. 11 is a pressure enthalpy diagram of the second valve control device 6 in the fully open mode under the heating mode. The second indoor heat exchanger 5 is equivalent to a condenser. Optionally, the second valve control device 6 may be in the throttle mode, so that the first indoor heat exchanger 4 and the second indoor heat exchanger 5 have different working pressures. The second indoor heat exchanger 5 is still a condenser. However, the pressure resistance requirements of the heat exchange tubes in the second indoor heat exchanger 5 are also lower. Therefore, the heat exchange capacity of the heat exchanger can be increased by increasing the cross sections of the channels of the heat exchange tubes. In the heating mode, the first indoor heat exchanger 4 and the second indoor heat exchanger 5 are both equivalent to condensers, which play a role in heating the air. This improves the heat exchange capacity of the system and is capable of improving the heating effect. In this embodiment, the temperature difference between the first heat exchange portion 81 and the second heat exchange portion 82 of the first heat exchanger 8 is small, and the amount of heat exchange is reduced, which is beneficial to lower the discharge temperature of the compressor.

Figure 12:
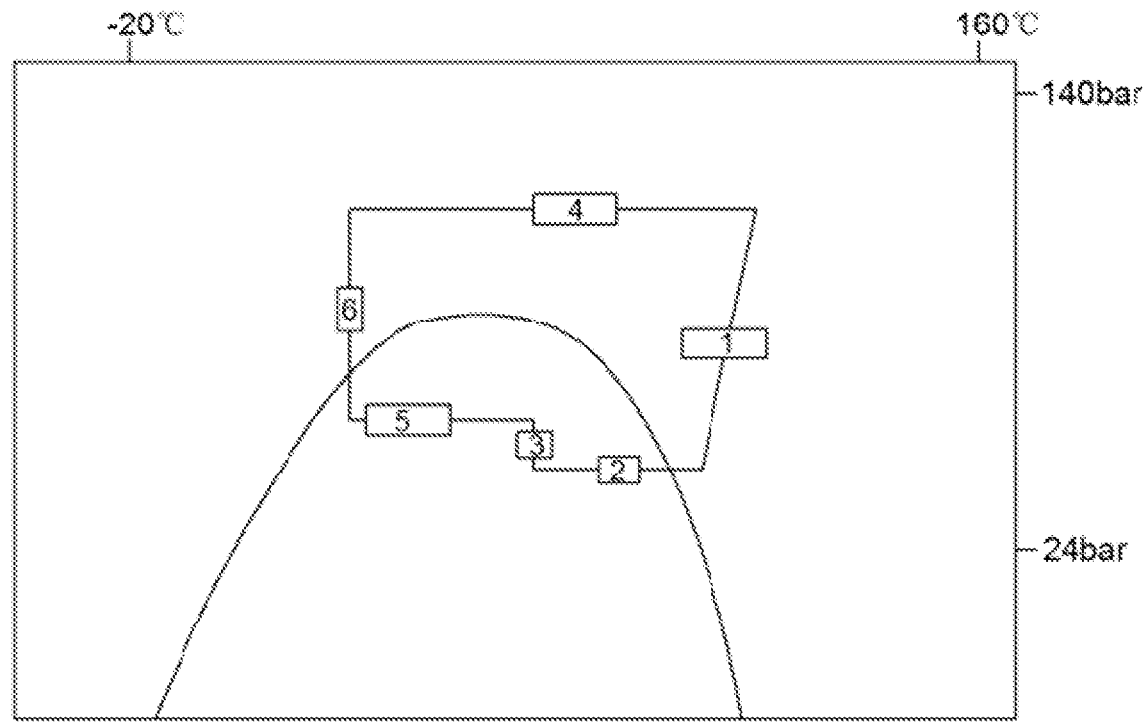
FIG. 12 is a schematic diagram of a pressure-enthalpy relationship in a heating and dehumidifying mode in accordance with the third embodiment of the present application.

A working principle diagram of the heating and dehumidifying mode can be referred to FIG. 10. FIG. 12 is a schematic diagram of the pressure-enthalpy relationship in the heating and dehumidifying mode. The first port 71 and the second port 72 are in communication, the third port 73 and the fourth port 74 are in communication, the first valve control device 3 is opened, the second valve control device 6 is in the throttle mode, and the compressor 1, the first indoor heat exchanger 4, the second valve control device 6, the second indoor heat exchanger 5, the first valve control device 3, the first heat exchange portion 81, the outdoor heat exchanger 2, the gas-liquid separator 9 and the second heat exchange portion 82 are communicated to form a loop. The first indoor heat exchanger 4 is a condenser, and the second indoor heat exchanger 5 is an evaporator, which can heat the environment in the passenger compartment while dehumidifying. The refrigerant has flowed through the first valve control device 3 and the second valve control device 6 to be twice throttled, which reduces the temperature entering the outdoor heat exchanger 2. This is beneficial to reduce the dryness of the gas-liquid two-phase refrigerant in the outdoor heat exchanger 2 (the more refrigerant in the gas phase, the higher the dryness). The heating and dehumidifying mode of the present application generates more heat.

Figure 13:
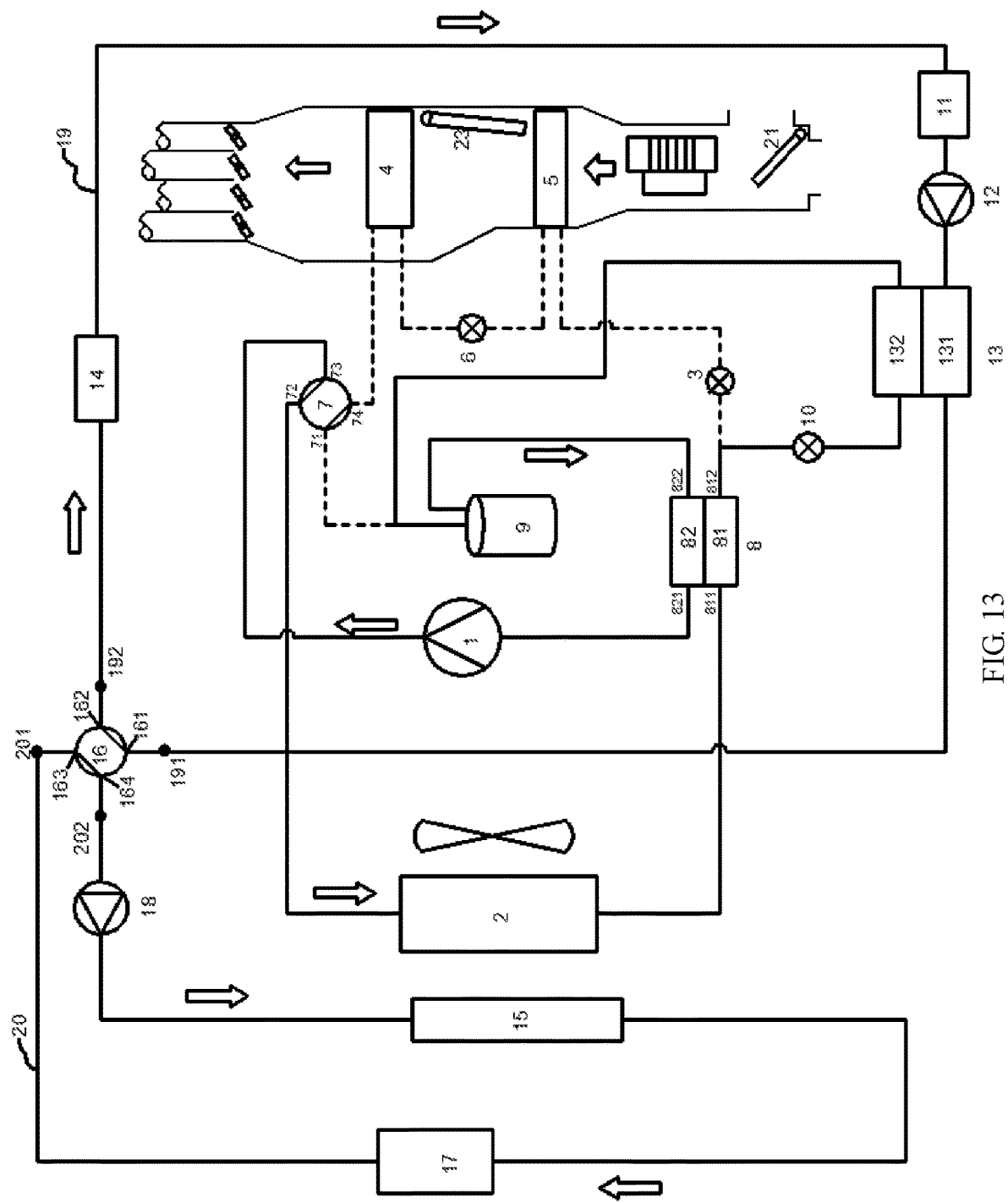
FIG. 13 is a schematic diagram of a working principle of a first battery cooling mode in accordance with a fourth embodiment of the present application.
Figure 14:
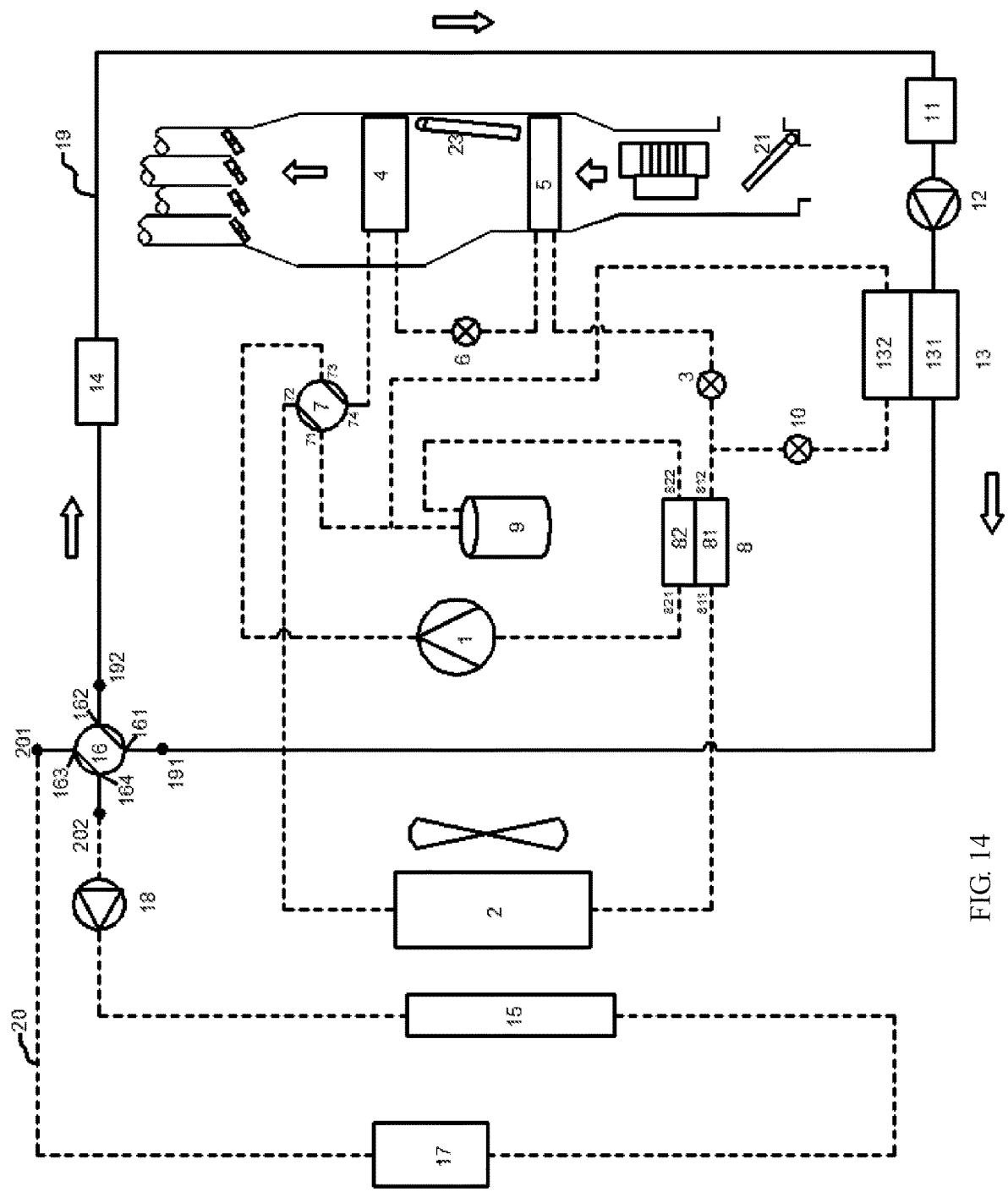
FIG. 14 is a schematic diagram of a working principle of a battery preheating mode in accordance with the fourth embodiment of the present application.
Figure 15:
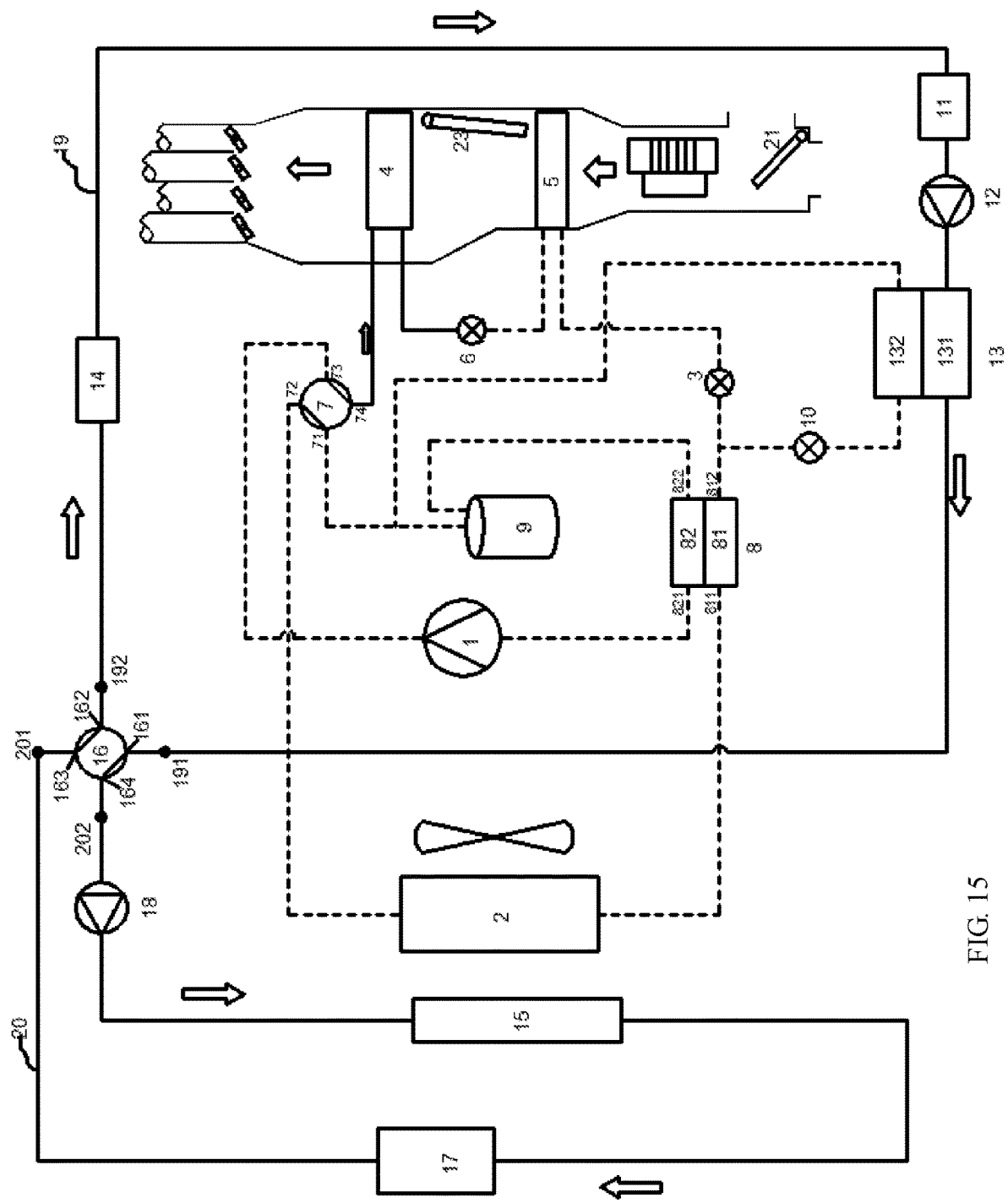
FIG. 15 is a schematic diagram of a working principle of a second battery cooling mode in accordance with the fourth embodiment of the present application.

A fourth embodiment is disclosed as shown in FIGS. 13 to 15. Based upon the third embodiment, the system of the present application further includes a third valve control device 10 and a coolant circulation loop. The coolant circulation loop includes a battery heat exchange unit 11, a first fluid driving device 12, a second heat exchanger 13, a heater 14, and a heat dissipation device 15 which are communicated by pipelines. The second heat exchanger 13 includes a third heat exchange portion 131 and a fourth heat exchange portion 132 which are capable of exchanging heat. The third valve control device 10 may be a multifunctional electronic expansion valve, for example, having both a fully open function and a throttle function. In some embodiments, the third valve control device may also be replaced by the first valve control device 3.

The coolant circulation loop further includes a second fluid switching device 16, a motor heat exchange unit 17, a second fluid driving device 18, a first flow path 19 and a second flow path 20. The first flow path 19 includes a fifth connection port 191 and a sixth connection port 192. The second flow path 20 includes a seventh connection port 201 and an eighth connection port 202. The battery heat exchange unit 11, the first fluid driving device 12, the third heat exchange portion 131 and the heater 14 are connected to the first flow path 19. The motor heat exchange unit 17, the second fluid driving device 18 and the heat dissipation device 15 are connected to the second flow path 20.

The second fluid switching device 16 is a four-way valve having a fifth port 161, a sixth port 162, a seventh port 163 and an eighth port 164. The fifth port 161 is in communication with the fifth connection port 191. The sixth port 162 is in communication with the sixth connection port 192. The seventh port 163 is in communication with the seventh connection port 201. The eighth port 164 is in communication with the eighth connection port 202. The second fluid switching device 16 includes a first communication state and a second communication state. In the first communication state, the first flow path 19 and the second flow path 20 are communicated in series to form a same circulation loop. In the second communication state, the first flow path 19 and the second flow path 20 are communicated in parallel to form two mutually independent loops.

The thermal management system of this embodiment includes a first battery cooling mode, a battery preheating mode and a second battery cooling mode.

As shown in FIG. 13, in the first battery cooling mode, the fifth port 161 and the sixth port 162 are in communication, the seventh port 163 and the eighth port 164 are in communication, the first fluid driving device 12 is opened and drives the coolant in the first flow path 19 to flow, and the third valve control device 10 is opened and throttles the refrigerant flow path. The battery heat exchange unit 11, the first fluid driving device 12, the third heat exchange portion 131 and the heater 14 (at this time the heater 14 is not working) are communicated to form a loop. At the same time, the compressor 1 of the refrigerant circulation loop starts to operate. The compressor 1, the outdoor heat exchanger 2, the first heat exchange portion 81, the third valve control device 10, the fourth heat exchange portion 132, the gas-liquid separator 9 and the second heat exchange portion 82 are communicated to form a loop.

A principle of battery cooling is as follows: firstly, the high temperature and high pressure gaseous refrigerant compressed by the compressor 1 enters the outdoor heat exchanger 2, and transfers heat to the outside environment through the outdoor heat exchanger 2. The refrigerant firstly flows through the first heat exchange portion 81 after being cooled. The temperature of the refrigerant in the first heat exchange portion 81 is higher than the temperature of the refrigerant in the second heat exchange portion 82. Therefore, the temperature of the refrigerant is decreased through heat exchange between the first heat exchange portion 81 and the second heat exchange portion 82. The low temperature refrigerant is throttled by the third valve control device 10 to further reduce the temperature. The low-temperature and low-pressure refrigerant then enters the fourth heat exchange portion 132. The coolant brings the heat of the battery heat exchange unit 11 to the third heat exchange portion 131. The third heat exchange portion 131 exchanges heat with the fourth heat exchange portion 132. The low-temperature refrigerant in the fourth heat exchange portion 132 absorbs the heat of the high-temperature coolant in the third heat exchange portion 131 to achieve the purpose of cooling the battery.

In the first battery cooling mode, the second fluid driving device 18 can be simultaneously opened and drive the coolant in the second flow path 20 to flow. The motor heat exchange unit 17, the second fluid driving device 18, and the heat dissipation device 15 are communicated to form a loop. The motor heat exchange unit 17 may include a motor and an inverter. The heat dissipation device 15 may be a heat dissipation water tank or a heat exchanger.

As shown in FIG. 14, in the battery preheating mode, the fifth port 161 and the sixth port 162 are in communication, the seventh port 163 and the eighth port 164 are in communication, the first fluid driving device 12 and the heater 14 are opened, the third valve control device 10 is closed, the refrigerant circulation loop does not work, and the battery heat exchange unit 11, the first fluid driving device 12, the third heat exchange portion 131 and the heater 14 are communicated to form a loop. The heater 14 may be an electric heater (for example, a PTC heater) or other type of heater. The coolant is heated when flowing through the heater 14, and the battery heat exchange unit 11 absorbs the temperature of the coolant so as to increase the battery temperature.

As shown in FIG. 15, in the second battery cooling mode, the fifth port 161 and the eighth port 164 are in communication, the sixth port 162 and the seventh port 163 are in communication, the first fluid driving device 12 is opened, the third valve control device 10 is closed, the heater 14 is closed, the heat dissipation device 15 and the heater 14 are located in the same flow path, and the battery heat exchange unit 11, the first fluid driving device 12, the third heat exchange portion 131, the second fluid driving device 18, the motor heat exchange unit 17, the heat dissipation device 15 and the heater 14 are communicated to form a loop. At this time, the heater 14 and the refrigerant circulation loop do not operate. It should be noted that the first fluid driving device 12 and the second fluid driving device 18 can be opened at the same time or one of them may be opened to drive the flow of the coolant. When the battery is charged quickly, it generates heat. If the heat cannot be discharged in time, it will cause safety hazards. When the battery is quickly charged, the system can be switched to the second battery cooling mode so as to cool the battery. The heat dissipation device 15 can be mainly utilized to absorb the heat of the coolant.

Optionally, in the second battery cooling mode, the heater 14 and the heat dissipation device 15 may also be located in two parallel flow paths, respectively. The flow path where the heater 14 is located is not in communication. The flow path where the heat dissipation device 15 is located is communicated. The battery heat exchange unit 11, the first fluid driving device 12, the third heat exchange portion 131, the heat dissipation device 15 and the motor heat exchange unit 17 are communicated to form a loop.

The above is only the preferred embodiments of the present application, and does not limit the present application in any form. Although the preferred embodiments of the present application have been disclosed above, they are not intended to limit the application. Any skilled person in the art, within the scope of not departing from the technical solutions of the present application, when the technical content disclosed above can be used to make some modifications or equivalent changes to the above embodiments by the technical essence of the application still fall within the scope of the technical solutions of the present application.

What is claimed is:

1. A thermal management system, comprising: a compressor, an outdoor heat exchanger, a first valve control device, a first indoor heat exchanger, a second indoor heat exchanger and a second valve control device, the compressor, the outdoor heat exchanger, the first valve control device, the first indoor heat exchanger, the second indoor heat exchanger and the second valve control device being connected by pipelines, the thermal management system comprising a cooling mode and a heating and dehumidifying mode; wherein in the cooling mode: the first valve control device and the second valve control device are opened; the compressor, the outdoor heat exchanger, the first valve control device, the second indoor heat exchanger, the second valve control device and the first indoor heat exchanger are in communication to form a loop; a refrigerant compressed by the compressor is adapted to flow in sequence through the outdoor heat exchanger, the first valve control device, the second indoor heat exchanger, the second valve control device and the first indoor heat exchanger, and enters the compressor again to circulate in this way;

in the heating and dehumidifying mode: the first valve control device and the second valve control device are opened; the compressor, the first indoor heat exchanger, the second valve control device, the second indoor heat exchanger, the first valve control device and the outdoor heat exchanger are in communication to form a loop; the refrigerant compressed by the compressor is adapted to flow in sequence through the first indoor heat exchanger, the second valve control device, the second indoor heat exchanger, the first valve control device and the outdoor heat exchanger, and enters the compressor again to circulate in this way;

wherein the first valve control device and the second valve control device both include a fully open mode and a throttle mode; in the heating and dehumidifying mode, the second valve control device is in the throttle mode, and the first valve control device is in the throttle mode or the fully open mode; in the cooling mode, the first valve control device is in the throttle mode, and the second valve control device is in the fully open mode or the throttle mode;

wherein the thermal management system further comprises a third valve control device and a coolant circulation loop; the coolant circulation loop comprises a battery heat exchange unit, a first fluid driving device and a second heat exchanger which are communicated by pipelines; the second heat exchanger comprises a third heat exchange portion and a fourth heat exchange portion which are capable of exchanging heat;

the thermal management system comprises a first battery cooling mode and in the first battery cooling mode;

the first fluid driving device and the third valve control device are opened, and the battery heat exchange unit, the first fluid driving device and the third heat exchange portion are in communication to form a loop; the compressor, the outdoor heat exchanger, the third valve control device and the fourth heat exchange portion are in communication to form a loop.

2. The thermal management system according to claim 1, wherein the thermal management system further comprises a heating mode in which the first valve control device and the second valve control device are opened; the compressor, the first indoor heat exchanger, the second valve control device, the second indoor heat exchanger, the first valve control device and the outdoor heat exchanger are in communication to form a loop; the refrigerant compressed by the compressor is adapted to flow in sequence through the first indoor heat exchanger, the second valve control device, the second indoor heat exchanger, the first valve control device and the outdoor heat exchanger, and enters the compressor again to circulate in this way; and wherein the first valve control device is in the throttle mode, and the second valve control device is in the fully open mode or the throttle mode.

3. The thermal management system according to claim 2, wherein the second valve control device comprises a first branch, a second branch and a third branch; the first branch, the second branch and the third branch are arranged in parallel; the first branch is provided with a first throttle unit, the second branch is provided with a second throttle unit, and the third branch is provided with a control valve unit;

in the heating and dehumidifying mode, the second throttle unit and the control valve unit are closed, and the first throttle unit is opened and throttles the first branch;

in the heating mode, the first throttle unit is closed; and the second throttle unit is closed, the control valve unit is opened, and the third branch is in communication; or, the control valve unit is closed, and the second throttle unit is opened and throttles the second branch;

in the cooling mode, the first throttle unit and the second throttle unit are closed, the control valve unit is opened, and the third branch is in communication.

4. The thermal management system according to claim 3, wherein the first valve control device comprises a fourth branch and a fifth branch which are arranged in parallel; the fourth branch is provided with a third throttle unit, and the fifth branch is provided with a fourth throttle unit; in the heating mode and the heating and dehumidifying mode, the fourth throttle unit is closed, and the third throttle unit is opened and throttles the fourth branch; in the cooling mode, the third throttle unit is closed, and the fourth throttle unit is opened and throttles the fifth branch.

5. The thermal management system according to claim 2, further comprising a first fluid switching device having a first port, a second port, a third port and a fourth port, the first port being in communication with an inlet of the compressor, the second port being in communication with the outdoor heat exchanger, the third port being in communication with an outlet of the compressor, and the fourth port being in communication with the first indoor heat exchanger;

in the heating mode or the heating and dehumidifying mode, the first port and the second port being in communication, and the third port and the fourth port being in communication; in the cooling mode, the first port and the fourth port being in communication, and the second port and the third port being in communication.

6. The thermal management system according to claim 1, further comprising a first heat exchanger having a first heat exchange portion and a second heat exchange portion which are capable of exchanging heat, the first heat exchange portion comprising a first connection port and a second connection port, the second heat exchange portion comprising a third connection port and a fourth connection port, the first connection port being in communication with the outdoor heat exchanger, the second connection port being in communication with the first valve control device, the third connection port being in communication with an inlet of the compressor, and the fourth connection port being in communication with the outdoor heat exchanger or the first indoor heat exchanger.

7. The thermal management system according to claim 1, wherein the coolant circulation loop further comprises a heater, the thermal management system comprises a battery preheating mode in which the first fluid driving device and the heater are opened, the third valve control device is closed, and the battery heat exchange unit, the first fluid driving device, the third heat exchange portion and the heater are in communication to form a loop.

8. The thermal management system according to claim 7, wherein the coolant circulation loop further comprises a heat dissipation device, and the thermal management system further comprises a second battery cooling mode in which the first fluid driving device is opened, the third valve control device is closed, and the heater is closed;

the heat dissipation device and the heater are located in a same flow path, and the battery heat exchange unit, the first fluid driving device, the third heat exchange portion, the heat dissipation device and the heater are in communication to form a loop.

9. The thermal management system according to claim 8, wherein the coolant circulation loop further comprises a second fluid switching device, a motor heat exchange unit, a second fluid driving device, a first flow path and a second flow path; the first flow path comprises a fifth connection port and a sixth connection port, the second flow path includes a seventh connection port and an eighth connection port; the battery heat exchange unit, the first fluid driving device, the third heat exchange portion and the heater are communicated to the first flow path, the motor heat exchange unit, the second fluid driving device and the heat dissipation device are communicated to the second flow path;

the second fluid switching device comprises a fifth port, a sixth port, a seventh port and an eighth port, the fifth port is in communication with the fifth connection port, the sixth port is in communication with the sixth connection port, the seventh port is in communication with the seventh connection port, and the eighth port is in communication with the eighth connection port;

in the first battery cooling mode and the battery preheating mode: the fifth port and the sixth port are in communication, the seventh port and the eighth port are in communication, and the first fluid driving device is opened;

in the second battery cooling mode: the fifth port and the eighth port are in communication, the sixth port and the seventh port are in communication, and the first fluid driving device is opened or/and the second fluid driving device is opened.

10. A thermal management system, comprising an air-conditioning box, a compressor, an outdoor heat exchanger, a first valve control device, a first indoor heat exchanger, a second indoor heat exchanger and a second valve control device, the first indoor heat exchanger and the second indoor heat exchanger being arranged in the air-conditioning box, the outdoor heat exchanger being arranged outside the air-conditioning box and in a front vehicle cabin, the thermal management system comprising a cooling mode and a heating mode, the first valve control device and the second valve control device being both bidirectional throttle valves; wherein in the cooling mode: the first valve control device and the second valve control device are opened; the compressor, the outdoor heat exchanger, the first valve control device, the second indoor heat exchanger, the second valve control device and the first indoor heat exchanger are in communication to form a loop; a refrigerant compressed by the compressor is adapted to flow in sequence through the outdoor heat exchanger, the first valve control device, the second indoor heat exchanger, the second valve control device and the first indoor heat exchanger, and enters the compressor again to circulate in this way; the first valve control device is in a throttle mode, the second valve control device is in a fully open mode or a throttle mode; the outdoor heat exchanger acts as a condenser to release heat into the air, the first indoor heat exchanger and the second indoor heat exchanger serve as evaporators to absorb heat from the air in the air-conditioning box;

in the heating mode, the first valve control device and the second valve control device are opened, the compressor, the first indoor heat exchanger, the second valve control device, the second indoor heat exchanger, the first valve control device and the outdoor heat exchanger are in communication to form a loop, the refrigerant compressed by the compressor is adapted to flow in sequence through the first indoor heat exchanger, the second valve control device, the second indoor heat exchanger, the first valve control device and the outdoor heat exchanger, and enters the compressor again to circulate in this way; the first valve control device is in the throttle mode, the second valve control device is in the fully open mode or the throttle mode, the first indoor heat exchanger and the second indoor heat exchanger act as condensers to release heat into the air-conditioning box, and the outdoor heat exchanger acts as an evaporator to absorb heat in the air;

wherein the thermal management system further comprises a third valve control device and a coolant circulation loop; the coolant circulation loop comprises a battery heat exchange unit, a first fluid driving device and a second heat exchanger which are communicated by pipelines; the second heat exchanger comprises a third heat exchange portion and a fourth heat exchange portion which are capable of exchanging heat;

the thermal management system comprises a first battery cooling mode and in the first battery cooling mode;

the first fluid driving device and the third valve control device are opened, and the battery heat exchange unit, the first fluid driving device and the third heat exchange portion are in communication to form a loop; the compressor, the outdoor heat exchanger, the third valve control device and the fourth heat exchange portion are in communication to form a loop.

11. The thermal management system according to claim 10, further comprising a heating and dehumidifying mode in which the first valve control device and the second valve control device are opened, the compressor, the first indoor heat exchanger, the second valve control device, the second indoor heat exchanger, the first valve control device and the outdoor heat exchanger are in communication to form a loop, the refrigerant compressed by the compressor is adapted to flow in sequence through the first indoor heat exchanger, the second valve control device, the second indoor heat exchanger, the first valve control device and the outdoor heat exchanger, and enters the compressor again to circulate in this way; the second valve control device is in the throttle mode, and the first valve control device is in the throttle mode or the fully open mode, the first indoor heat exchanger acts as a condenser to release heat into the air-conditioning box, the evaporator of the second indoor heat exchanger absorbs heat in the air-conditioning box and removes moisture in the air, and the outdoor heat exchanger acts as an evaporator to absorb heat in the air.

12. The thermal management system according to claim 11, further comprising a first fluid switching device having a first port, a second port, a third port and a fourth port, the first port being in communication with an inlet of the compressor, the second port being in communication with a first end of the outdoor heat exchanger, the third port being in communication with an outlet of the compressor, and the fourth port being in communication with the first indoor heat exchanger;

in the heating mode or the heating and dehumidifying mode, the first port and the second port being in communication, and the third port and the fourth port being in communication; in the cooling mode, the first port and the fourth port being in communication, and the second port and the third port being in communication.

13. The thermal management system according to claim 12, wherein the coolant circulation loop comprises a first flow path, a second flow path and a second fluid switching device, the first flow path comprises the battery heat exchange unit, the first fluid driving device and the third heat exchange portion of the second heat exchanger, the second flow path comprises a heat dissipation device, a motor heat exchange unit and a second fluid driving device, a first end of the fourth heat exchange portion is in communication with the third valve control device, and a second end of the fourth heat exchange portion is in communication with the inlet of the compressor;

the second fluid switching device comprises a first communication state and a second communication state; in the first communication state, the first flow path and the second flow path are communicated in series to form a same circulation loop; and in the second communication state, the first flow path and the second flow path are in communication in parallel to form two mutually independent loops;

wherein the first fluid switching device and the second fluid switching device are both four-way valves.

14. The thermal management system according to claim 10, further comprising a first heat exchanger having a first heat exchange portion and a second heat exchange portion which are capable of exchanging heat, the first heat exchange portion comprising a first connection port and a second connection port, the second heat exchange portion comprising a third connection port and a fourth connection port, the first connection port being in communication with a second end of the outdoor heat exchanger, the second connection port being in communication with the first valve control device, the third connection port being in communication with an inlet of the compressor, the fourth connection port being in communication with the outdoor heat exchanger or the first indoor heat exchanger.

15. A thermal management system, comprising: an air-conditioning box, a compressor, an outdoor heat exchanger, a valve control device, a first indoor heat exchanger, and a second indoor heat exchanger, the first indoor heat exchanger and the second indoor heat exchanger being arranged in an air-conditioning box, the outdoor heat exchanger being arranged out of the air-conditioning box, the thermal management system comprising a cooling mode;

wherein in the cooling mode, the compressor, the outdoor heat exchanger, the valve control device, the second indoor heat exchanger, and the first indoor heat exchanger are in communication to form a loop, the valve control device is in a throttle mode, the outdoor heat exchanger acts as a condenser to release heat into the air of environment, and the first indoor heat exchanger and the second indoor heat exchanger serve as evaporators to absorb heat from the air in the air-conditioning box;

wherein the thermal management system further comprises a third valve control device and a coolant circulation loop; the coolant circulation loop comprises a battery heat exchange unit, a first fluid driving device and a second heat exchanger which are communicated by pipelines; the second heat exchanger comprises a third heat exchange portion and a fourth heat exchange portion which are capable of exchanging heat;

the thermal management system comprises a first battery cooling mode and in the first battery cooling mode;

the first fluid driving device and the third valve control device are opened, and the battery heat exchange unit, the first fluid driving device and the third heat exchange portion are in communication to form a loop; the compressor, the outdoor heat exchanger, the third valve control device and the fourth heat exchange portion are in communication to form a loop.

16. The thermal management system according to claim 15, further comprising a heating mode, wherein in the heating mode, the compressor, the first indoor heat exchanger, the second indoor heat exchanger, the valve control device, and the outdoor heat exchanger are in communication to form a loop, the valve control device works at a throttle mode, both of the first indoor heat exchanger and the second indoor heat exchanger act as condensers to release heat into the air of the air-conditioning box, and the outdoor heat exchanger acts as an evaporator to absorb heat from the air of environment.

17. The thermal management system according to claim 15, further comprising a dehumidifying mode, wherein in the dehumidifying mode, the compressor, the first indoor heat exchanger, the valve control device, the second indoor heat exchanger, and the outdoor heat exchanger are in communication to form a loop, the valve control device works at a throttle mode, the first indoor heat exchanger act as condensers to release heat into the air of the air-conditioning box, the second indoor heat exchanger acts as an evaporator to absorb heat from the air of environment of the air-conditioning box, and the outdoor heat exchanger acts as an evaporator to absorb heat from the air of environment.

18. The thermal management system according to claim 15, wherein the valve control device is a bidirectional throttle valve, work modes of the valve control device include a fully open mode and the throttle mode, and the valve control device are capable of working at the throttle mode in different work modes of the thermal management system.

19. The thermal management system according to claim 15, wherein the valve control device comprises a first valve control device and a second valve control device, the first valve control device is in communication between the outdoor heat exchanger and the second indoor heat exchanger, the second valve control device is in communication between the first indoor heat exchanger and the second indoor heat exchanger.

* * * * *